Sept. 16, 1969   J. SILGAILIS   3,467,895
MANGANOUS NITRATE-CATALYTIC AGENT SOLUTION FOR
SOLID ELECTROLYTE CAPACITOR
Filed Nov. 28, 1967

INVENTOR
JOHN SILGAILIS
BY Charles W. Hoffmann
ATTORNEY

3,467,895
Patented Sept. 16, 1969

3,467,895
MANGANOUS NITRATE-CATALYTIC AGENT SOLUTION FOR SOLID ELECTROLYTE CAPACITOR
John Silgailis, Billerica, Mass., assignor to P. R. Mallory & Co. Inc., Indianapolis, Ind., a corporation of Delaware
Filed Nov. 28, 1967, Ser. No. 686,266
Int. Cl. H01g 9/00; C09k 3/00
U.S. Cl. 317—230                    17 Claims

ABSTRACT OF THE DISCLOSURE

A solution containing manganous nitrate and a catalytic agent which volatilizes or decomposes at a temperature of about 100–150° C. and induces the precipitation of manganous hydroxide particles by increasing the pH of the manganous nitrate solution having a pH below about 2 to about 3 to 6. The manganous hydroxide particles are precipitated and converted in situ by the application of heat in the range of about 100–150° C. to provide manganese dioxide nucleation sites. Thereafter the anode is dipped into a standard manganous nitrate solution and the anode is subjected to a temperature of about 200–400° C. to pyrolytically convert the manganous nitrate to manganese dioxide.

---

The present invention relates to improved means and methods of fabricating solid electrolyte capacitors, and more particularly to a solution containing manganous nitrate and a catalytic agent which generates manganese dioxide nuclei and substantially lowers the energy required for pyrolysis.

Several of the presently available solid electrolyte capacitors are fabricated by pressing and sintering a film-forming metal such as tantalum, aluminum, niobium, titanium, zirconium, hafnium, and the like into a pellet having a multiplicity of intercommunicating voids. The pellet is subjected to an anodization or electroformation step by passing a direct current from the pellet through an electrolyte in which the pellet is immersed to a vessel containing the electrolyte and the pellet. The voltage applied to the anode may range from about 10–300 volts depending on the film-forming metal used and the thickness of the anodized film desired. Generally, the higher the voltage applied to the anode, the thicker the resulting oxide film and the lower the resulting capacitance of the capacitor. The electrolyte solution may be an aqueous solution of sulfuric acid, nitric acid, phosphoric acid, and the like. After anodization, the pellet is impregnated with a solution of manganous nitrate and heated in air at a sufficient temperature, generally about 200 to 400° C., to effect the pyrolytic conversion of the manganous nitrate covering the pellet and permeating the pores thereof to the semiconductive material manganese dioxide. It is thought that the initial pyrolysis step requires a net input of heat of about 58 kilocalories per mole of manganous nitrate. The anodization step and the pyrolytic conversion step may be repeated as many times as is necessary in order to obtain an anode having the desired electrical characteristics. The manganese dioxide layer is the dry electrolyte for the capacitor. The cathode of the capacitor may be prepared using conventional methods. For example, an electrically conductive layer may be applied over the manganese dioxide layer. Preferably, a graphite layer is applied to the oxidized anode before the cathode layer is applied. The capacitor is completed by attaching leads to the anode and to the cathode and encapsulating the capacitor.

It is known that the solution containing manganous nitrate impregnating a porous pellet may be converted to manganese (IV) dioxide in situ by pyrolysis. However, the pyrolytic conversion of the solution of manganous nitrate to manganese dioxide may not occur uniformly throughout the solution of manganous nitrate overlying the dielectric oxide film of the anode. The pyrolytic conversion tends to take place at nucleation sites consisting essentially of manganese dioxide particles. During the initial phase of pyrolytically converting the solution of manganous nitrate, manganese dioxide nuclei do not exist. Therefore, pyrolysis of the initial manganese dioxide layer proceeds somewhat differently than subsequent pyrolytic conversion steps wherein the solution of manganous nitrate is converted to manganese dioxide. Manganese dioxide nuclei appear to form only after some portion of the solution of manganous nitrate has attained a temperature of about 180° C. The nuclei of manganese dioxide appear to form in the solution of manganese nitrate at the exposed surface, that is, the surface nearest to the source of heat. Thus, it is thought that pyrolytic conversion of the solution of manganous nitrate to manganese dioxide proceeds from the exterior or exposed surface of the solution of manganous nitrate toward the dielectric oxide film of the anode. The solution of manganous nitrate at the interface is, therefore, thought to be converted after the conversion of the exterior surface of the solution of manganous nitrate to manganese dioxide. As a result of the progressive conversion of the solution of manganous nitrate, the manganese dioxide at the interface tends to be spongy. It is thought that the $NO_2$ gas released during pyrolysis of the solution of manganous nitrate at the interface proceeds through the newly converted manganese dioxide forming gas escape holes. The gas escape holes may extend to the dielectric oxide film thereby permitting the existence of areas of oxide film not contacted by manganese dioxide electrolyte layer. Other factors may also cause the spongy nature of the initial layer of manganese dioxide. In any event, repeating the pyrolytic conversion step several more times fills several of the heretofore uncovered dielectric oxide film areas, however, uncovered areas continue to persist. Thus, it is seen that the combination of the initial manganese dioxide layer and subsequent manganese dioxide layers do not cover the oxide film dielectric formed on the anode in toto.

It has been found that capacitors fabricated from a film-forming metal such as tantalum, and in particular, tantalum capacitors having a low voltage rating and a high capacitance rating undergo deleterious changes in electrical characteristics with a change in humidity of the ambient air. For example, if the humidity of the ambient air increases from an initial humidity, the capacitance and the dissipation factor increase; when the humidity decreases to about the initial value, the capacitance and dissipation factor of the capacitor decrease to about their original values. The cause for variation in the electrical properties of a film-forming anode capacitor is not known for certain, however, it is thought that the variation of the electrical characteristics is related in some way to the areas of the dielectric oxide film not covered by the manganese dioxide. In such a situation, the capacitor is not utilizing the entire potential capacitance thereof. Therefore, it is thought that when the moisture content of the ambient air is increased and when the increased moisture comes in contact with the uncovered surface of the anode and/or permeates the intercommunicating voids of the anode, sufficient electrolyte-like material is formed as a result of combining with carbon dioxide in the air or ionizable material in the anode such as in the semiconductive layer of manganese dioxide so as to cover some or all of the exposed areas of the tantalum oxide film thus causing the newly covered areas to exhibit capacitance not exhibited heretofore. It is thought, therefore, that the additional capacitance found under the newly formed electrolyte-like material causes the increase in the capacitance of the capacitor. In addition, it is thought that the newly formed electrolyte-like material has a high resistivity which causes the capacitor to exhibit an increase in the dissipation factor.

Attempts have been made to overcome the above problems by encapsulating the capacitor with a hermetic enclosure to thereby control the humidity of the ambient air surrounding the anode. Hermetic sealing does assist in stabilizing the electrical properties of the capacitor, however, the inner walls of the hermetic closure and the anode itself carry a film of water which is released as water vapor when the capacitor is subjected to operating temperatures in excess of 100° C. to thereby affect the electrical characteeristics of the capacitor. In addition, true hermetic seals are difficult to obtain. Hermetic seals may have minute pin holes which allow a slow but harmful exchange of the ambient air contained within the enclosure with the air surounding the hermetic container. It has been found that both hermetically sealed and non-hermetically sealed units typically utilize about 70 to 80% of the total available or potential capacitance. Release of water vapor in the hermetically sealed unit will activate some or substantially all of the unactivated available or potential capacitance. Thus, it is seen that although hermetic enclosures enjoy a measure of success, the approach does not attempt to overcome that which is thought to be one of the reasons why dry electrolytic capacitors are sensitive to changes in the moisture content of the ambient air.

It is thought that the effective capacitance of a film-forming capacitor may be increased to within about five per cent and with the exercise of care to within one percent of the available or potential capacitance by improving the quality of the manganese dioxide coating. By improving the quality of the manganese dioxide coating, it is thought that the available capacitance can be more efficiently utilized and the capacitance variations due to moisture can be largely eliminated.

The aforementioned problems are overcome by the present invention by providing a solution of manganous nitrate and a catalytic agent selected from the group consisting of organic and inorganic soluble, ammonia releasing agents which when added to an acidic solution of manganous nitrate raise the pH of the manganous nitrate solution. The term "catalytic" is used in the wider sense to include direct chemical action. The catalytic agent causes precipitation of a large number of fine manganous hydroxide particles in a thin layer over the oxide film of the anode by increasing the pH of the solution from less than 2 to about 3 to 6. The manganous hydroxide precipitate clings to the dielectric film and oxidation of the precipitate provides a large number of uniformly dispersed nucleation sites of manganese dioxide in direct and intimate contact with and integrally bonded to the dielectric oxide film. The nucleation sites on the oxide film tend to concentrate the pyrolytic conversion of the manganous nitrate at the interface between the solution of manganous nitrate and the oxide film rather than at the exterior surface of the solution of manganous nitrate. A substantially solid or continuous initial manganese dioxide layer is uniformly formed over the dielectric oxide film. The initial manganese dioxide layer is not undercut or uplifted because pyrolysis is initiated at the interface between the dielectric oxide and the manganous nitrate-catalytic agent solution and not at the exterior surface of the solution of manganous nitrate-catalytic agent and because no gases are evolved between the solution of manganous nitrate and the solid manganese dioxide layer during pyrolytic conversion of the manganous nitrate.

When manganous nitrate is heated to a temperature of about 150° C. or more, the manganous nitrate has a tendency to form a crystalline salt before pyrolysis is initiated. Typically, the crystalline salt is not in intimate contact with the oxide film and upon pyrolization of the salt, the resulting manganous dioxide layer is not in intimate contact with the oxide film. In the present invention, the precipitate, manganous hydroxide, is converted to manganese dioxide nucleation sites at about 120–130° C. which is less than the temperature at which the manganous nitrate forms the dry crystalline salt.

Therefore, it is an object of the present invention to provide a capacitor having a porous anode of film-forming material which has a uniform, substantially non-porous of continuous semiconductive layer of manganese dioxide overlying and in intimate contact with substantially all of the dielectric oxide film formed on a substrate.

A further object of the present invention is to provide a capacitor which utilizes up to about 95 to 99 percent of its total available capacitance by improving the quality of the semiconductive electrolyte layer covering the anode.

Another object of the present invention is to provide a solution of manganous nitrate and a catalytic agent which, the application of an appropriate temperature results in a manganese dioxide film in intimate contact with and integrally bonded to substantially all of the dielectric oxide film thereby further stabilizing the electrical properties of the film-forming metal capacitor.

A further object of the present invention is to provide a solution of manganous nitrate containing a catalytic agent selected from the group consisting of organic and inorganic ammonia yielding compounds which cause precipitation of manganous hydroxide from a solution of manganous nitrate which is pyrolytically converted in situ to provide a substantially uniform, non-porous or continuous semiconductive layer of manganese dioxide overlying the dielectric oxide film formed on the anode of the capacitor.

Yet another object of the present invention is to provide a solution of manganous nitrate containing a catalytic agent selected from the group consisting of ammonium nitrate and urea.

Yet still another object of the present invention is to provide a film-forming metal capacitor wherein the catalytic agent of a solution of manganous nitrate and a catalytic agent causes precipitation of manganous hydroxide when heated to a temperature of about 100°–150° C., the manganous hydroxide precipitate clings to the dielectric oxide film so as to provide nucleation sites at the interface between the solution and the dielectric oxide film.

A further object of the present invention is to provide a solid electrolyte capacitor having increased capacitance and reduced dissipation factor.

Yet another object of the present invention is to provide a solid electrolyte capacitor having a substantially nonporous or continuous layer of manganese dioxide overlying the dielectric oxide film.

Another object of the present invention is to provide a solution of manganous nitrate and a catalytic agent which when pyrolytically converted to manganese dioxide does not produce by-products which deleteriously affect the opperation of a solid electrolyte capacitor.

A further object of the present invention is to provide a solid electrolyte capacitor wherein a solution of manganous nitrate and a catalytic agent over the dielectric oxide film is pyrolytically converted in situ beginning with the portion of the solution at the interface between the dielectric oxide film and the solution and ending with the exposed surfaces of the solution.

Yet another object of the present invention is to provide an improved means and method for pyrolytically converting in situ a solution of manganous nitrate and a catalytic agent overlying a dielectric oxide film.

A further object of the present invention is to provide a solid electrolyte capacitor which is simple in construction, has more stable electrical characteristics and is economical to manufacture.

Another object of the present invention is to provide a solution consisting of a concentration of about 0.1 to 10 percent by weight of ammonium nitrate, and a concentration of at least 20% by weight manganous nitrate.

The present invention in another of its aspects, relates to the novel features of the instrumentalities of the invention described herein for teaching the principal object of the invention and to the novel principles employed in the instrumentalities whether or not these principles may be used in the said object and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement, and cooperation of elements as hereinafter described and more particularly as defined in the appended claims.

The appended drawings illustrate the present invention constructed to function in the most advantageous mode devised for the practical application of the basic principles in the hereinafter described invention.

Generally speaking, the present invention relates to means and methods of fabricating an electrolyte capacitor having an anode formed from a film-forming metal, an anodized dielectric film formed on the surface of the anode and a substantially uniform, continuous manganese dioxide electrolyte layer overlying the film. The the initial electrolyte layer is the conversion product of a solution of manganous nitrate and a catalytic agent. A large number of fine manganous hydroxide particles are precipitated from the solution and converted to manganous dioxide upon the application of an elevated temperature which is about 150° C. or less.

Figure 1:
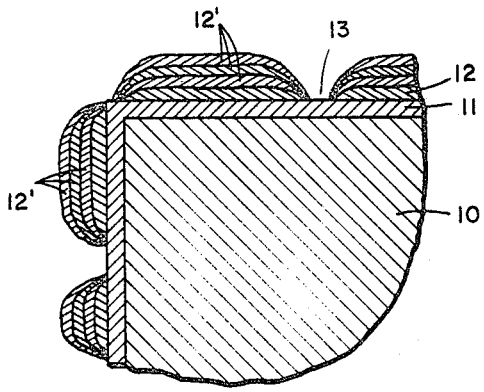
FIGURE 1 is an enlarged fragmentary cross-sectional view of a solid electrolytic capacitor illustrating the holes in the semiconductive manganese dioxide layer permitting ambient air to contact the oxide film of the anode. Aspects of the views have been disproportionately illustrated in order to more clearly show the areas not covered by the semiconductive layer.

Referring now to the enlarged partial cross-sectional view illustrated in FIGURE 1 of the drawing, an anode of the capacitor fabricated from the suitable film-forming metal such as tantalum or the like is indicated by the reference number 10. The various layers covering the anode are shown disproportionately enlarged with respect to one another in order to more fully illustrate the problems which the present invention overcomes. The porous pellet includes a multiplicity of intercommunicating voids (not shown). During fabrication thereof, the pellet is subjected to electroformation by passing a suitable direct current from the pellet through an electrolyte and in which the pellet is immersed to a tank containing the electrolyte and the pellet.

The anodized pellet 10 may be impregnated with a commercially available standard manganous nitrate solution having a concentration of about 50 percent by weight manganous nitrate and heated in air at a temperature in excess of 200° C. for a sufficient length of time to effect the pyrolytic conversion of the standard manganous nitrate to manganese dioxide 12. It is thought that the dielectric oxide film 11 is not completely covered by the initial manganese dioxide layer 12 as shown in FIGURE 1 due to the initiation of pyrolytic conversion at the exterior surface of the standard solution of manganous nitrate rather than at the interface between the solution of manganous nitrate and the dielectric oxide film, due to the effect of escaping gases generated during the pyrolytic conversion of a manganous nitrate between the oxide film and the newly formed manganese dioxide layer and/or due to the formation of a crystalline salt of manganous nitrate at about 150° C. which is converted to manganese dioxide at about 200° C. Repeating the impregnation and conversion steps several more times results in a partial covering of the uncovered areas of dielectric oxide film with semiconductive manganese dioxide 12'. However, the covering is incomplete thereby leaving exposed dielectric oxide film areas as shown at 13. In both non-hermetically sealed and hermetically sealed capacitor units, the dry capacitance of the units is frequently 70 to 80% of the available or potential capacitance of the units. The potential capacitance is substantially equal to the wet capacitance of the unit. The wet capacitance is determined by measuring the capacitance of a unit at about 25° C. in a relative humidity of about 100%. It is thought that when the incompletely covered dielectric oxide film is subjected to increased humidity, electrolyte-like material is formed which causes the capacitor to exhibit capacitance not heretofore exhibited thereby causing the capacitance of the capacitor to vary.

Figure 2:
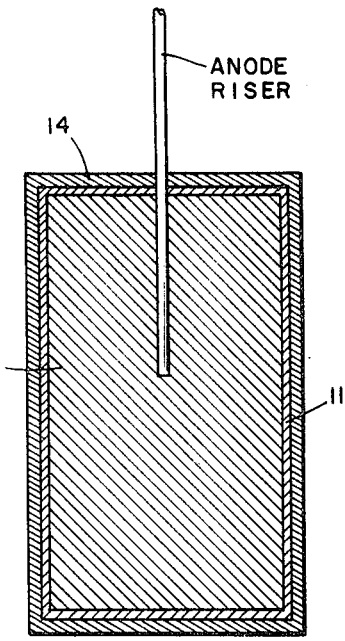
FIGURE 2 is an enlarged cross-sectional view of a solid electrolytic capacitor illustrating a substantially uniform, nonporous or continuous semiconductive layer of manganese dioxide substantially completely overling and in intimate contact with and integrally bonded to the dielectric oxide film formed on the anode of a solid electrolytic capacitor.
Figure 3:
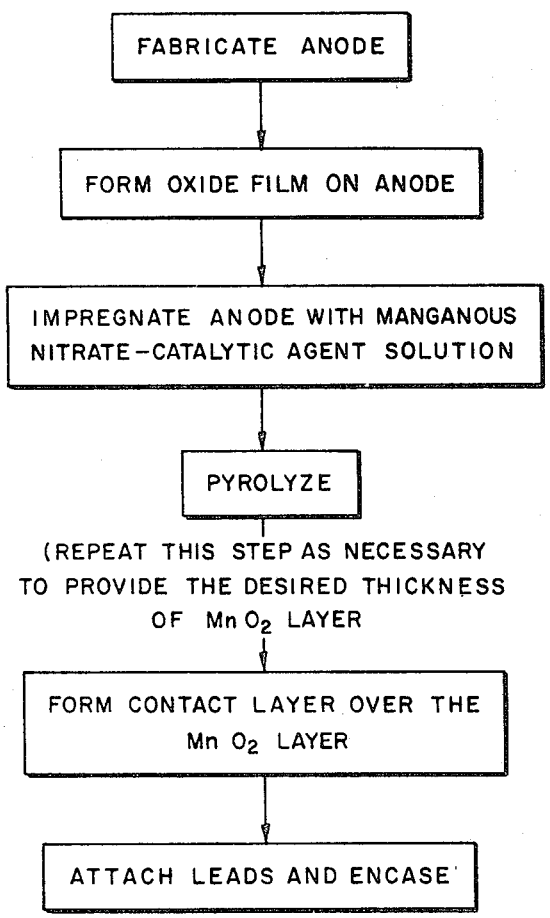
FIGURE 3 is a diagrammatic illustration of the method of the present invention.

By using a solution of manganous nitrate and a catalytic agent, a uniform, substantially non-porous or continuous semiconductive manganese dioxide layer 14 is formed overlying and in intimate contact with and integrally bonded to the dielectric oxide film 11 formed on the anode 10 as illustrated in FIGURE 2. The solution of manganous nitrate and catalytic agent consists essentially of an acidic manganous nitrate solution and a catalytic agent. The catalytic agent is a water soluble ammonia releasing agent capable of raising the pH of the manganous nitrate solution from less than 2 to a pH of about 3 to 6. Such agents include water soluble inorganic ammonia releasing compounds or salts including ammonium nitrate, ammonium halides (ammonium chloride, ammonium floride, and ammonium triodide), ammonium sulfates, ammonium carbonates, amonium borates, ammonium tetraborate, and ammonium phosphates. Of the above-mentioned inorganic ammonia releasing salts, ammonium nitrate and the ammonium halides are preferred. Ammonium nitrate is especially preferred since it does not produce contaminating by-products. Other catalytic agents include water soluble organic ammonia releasing compounds including one or more amide groups (preferably 3 or less amide groups) and having a molecular weight of 400 or less. The organic ammonia releasing compounds include urea, ethyl carbonate, methyl carbonate, acetamide, benzamide, isobutyramide, 2,4-dimethylacetanilide and m-tolylurea. Urea is especially preferred since it does not produce contaminating by-products.

In a solution of manganous nitrate containing less than 0.5% of free nitric acid, both ammonium nitrate and urea, upon decomposition, cause an increase in the concentration of the OH ions (increase the pH of the solution) in solution and poorly soluble manganous hydroxide precipitates. The chemical reaction involved may be expressed as follows: $Mn^{++} + 2OH^- \rightarrow Mn(OH)_2$.

The equation for the pyrolytic decomposition of standard manganous nitrate to manganese dioxide may be expressed as follows: $Mn(NO_3)_2 + heat \rightarrow MnO_2 + 2NO_2$.

The manganous hydroxide precipitate may be oxidized by the by-product $NO_2$ formed during the decomposition of the ammonium nitrate or the urea. The oxidation of the manganous nitrate by $NO_2$ requires less energy than the pyrolytic conversion of the standard manganous nitrate. In the presence of manganous hydroxide, the formation of manganese dioxide is more favored than in the standard manganous nitrate solution due to the lower energy requirements and the presence of manganese dioxide nucleation sites. It is thought that the pyrolytic conversion of the standard manganous nitrate solution requires about 58 kilocalories per mole of manganous nitrate whereas the oxidation of the manganous hydroxide by $NO_2$ generates or releases heat at a rate of about 2 kilocalories per mole.

It was found that strongly acidic solution of manganous nitrate, that is, solutions having over 2% by weight nitric acid, including a catalytic agent of ammonium nitrate cause nucleation sites of manganese dioxide to form at a temperature of less than 130° C. without a significant increase in the pH value. It is thought that the manner in which the ammonium nitrate enhances the oxidation of the $Mn^{++}$ is catalytic.

Of the several possible catalytic agents, ammonium nitrate appears to be the most versatile of the catalysts since it is effective in a wide range of concentrations and is not deleteriously affected by the free nitric acid contained in the solution of manganous nitrate. The percent by weight of ammonium nitrate of the total weight of the constituents of the solution is about 0.1 to 10 percent by weight. It was found that less than about 0.1 percent by weight ammonium nitrate in the solution results in the loss of the effectiveness of ammonium nitrate as a catalytic agent. If the solution contains excess of about 10 percent by weight ammonium nitrate, an undesirable increase in the D.C. leakage characteristic of the capacitors is noted.

The catalytic agent induces the formation of manganese dioxide nucleation sites in the manganous nitrate solution at a temperature of 100–150° C., generally, however, the formation occurs at a temperature of about 120°–130° C. The pyrolysis begins at a temperature lower than the temperature usually associated with the pyrolytic conversion of a solution of standard manganous nitrate. Thus, the initial manganese dioxide layer is precipitated from solution before the manganous nitrate solution dries to form a crystalline salt. Typically, the crystalline salt is not in intimate contact with the oxide film and upon pyrolization of the salt, the resulting $MnO_2$ layer is not in intimate contact with the oxide film. Increases of up to 17% and higher in the dry capacitance of a capacitor have been noted in capacitors having a manganese dioxide layer formed using the manganous nitrate-catalytic agent solution of the present invention.

The following will further serve to exemplify the inventive aspects of the present invention.

Example I

Five capacitors are prepared by pressing and sintering high CV tantalum powder. Each of the sintered tantalum anodes weighs about 1.5 grams. The anodes are subjected to anodization by passing a direct current of about 18 volts from the anode through a solution of about 0.1% by volume hot phosphoric acid in which the anode is immersed in a tank containing the electrolyte and the pellet. After anodization, the anode is impregnated with a solution of manganous nitrate and ammonium nitrate. The concentration of manganous nitrate is about 33% by weight while the concentration of ammonium nitrate is about 2% by weight with the remainder essentially water. The individual anodes are immersed in the solution, removed and heated to a temperature of about 120°–130° C. for about 10–20 minutes to cause a fine precipitate of manganous hydroxide to form on the anodes. Pyrolysis of the precipitate begins during the above heating step and a large number of manganese dioxide nuclei are provided to serve as centers for further $MnO_2$ growth. The anodes are then dipped into a standard manganous nitrate solution having a concentration of about 50% by weight manganous nitrate. The anodes are then subjected to a temperature of about 200 to 250° C. to convert the standard manganous nitrate to manganese dioxide. The last mentioned step may be repeated several more times in order to achieve the desired manganese dioxide thickness. In the preparation of the above mentioned anodes, the dipping and conversion steps are repeated about seven times in order to achieve the desired $MnO_2$ thickness. The anodes are completed using standard techniques.

Five additional capacitors are prepared using the method outlined in the preparation of the initial five capacitors except that the impregnating solution is a standard manganous nitrate, that is, a solution having a concentration of about 50% by weight manganous nitrate and that does not contain a catalytic agent.

The wet and dry capacitances of 5 units fabricated using a standard manganous nitrate solution is compared with the wet and dry capacitances of 5 units fabricated using a manganous nitrate-ammonium nitrate solution. The wet capacitance of the completed unit is determined in a relative humidity of about 100% at 25° C. while the dry capacitance of the completed unit in a relative humidity of about 5% at about 25° C. The measurements are as follows:

SOLUTION OF MANGANOUS NITRATE-AMMONIUM NITRATE

| Unit No. | Wet cap. (mf.) | Dry cap. (mf.) |
| --- | --- | --- |
| 1 | 453.5 | 447.1 |
| 2 | 447.6 | 437.1 |
| 3 | 446.6 | 433.2 |
| 4 | 451.2 | 436.8 |
| 5 | 455.5 | 438.9 |

SOLUTION OF STANDARD MANGANOUS NITRATE

| | | |
| --- | --- | --- |
| 6 | 446.5 | 411.1 |
| 7 | 445.7 | 401.8 |
| 8 | 446.6 | 406.4 |
| 9 | 453.6 | 407.2 |
| 10 | 448.5 | 405.5 |

The foregoing table illustrates the improvement of the anodes of the present invention over prior art capacitors. The wet capacitance is said to be substantially equal to the potential capacitance of the individual unit at about 25° C. whereas the dry capacitance is the capacitance of the unit operating in a substantially dry atmosphere at about 25° C. As can be observed, the capacitors fabricated using the teachings of the present invention all showed a substantial improvement in utilization of potential capacitance when the wet and dry capacitances thereof are compared. The various between the potential or wet capacitance and the dry capacitance of the units fabricated using the solution of manganous nitrate-ammonium nitrate is about 1 percent to about 4 percent. The variance between the potential or wet capacitance and the dry capacitance of the units fabricated using a standard solution of manganous nitrate is significantly higher.

Example II

Other solid electrolyte capacitors of the present invention which exhibit improved performance are prepared by using substantially the same methods as the foregoing example except that urea in a concentration of about 4 percent, by weight, is used in place of ammonium nitrate.

The present invention is not intended to be limited to the disclosure herein and changes and modifications may be made in the disclosure by those skilled in the art without departing from the spirit and the scope of the novel concepts of this invention. Such modifications and variations are considered to be within the purview and scope of this invention and appended claims.

Having thus described my invention, I claim:

1. In an electrolyte capacitor having an anode of film-forming metal, a dielectric oxide film formed on the surface of said anode, a first substantially continuous manganese dioxide electrolyte layer overlying said film and at least one manganese dioxide layer overlying said substantially continuous first layer, said continuous first layer being the in situ pyrolytic conversion product of a solution of manganous nitrate containing a soluble ammonia releasing material, and said first layer containing nucleation manganese dioxide products of a pyrolytic conversion of said solution within a range of temperature less than the pyrolytic conversion temperature of manganous nitrate to manganese dioxide.

2. In an electrolyte capacitor having an anode of film-forming metal as claimed in claim 1, wherein said capacitor utilizes at least 95 percent of its available capacitance.

3. In an electrolyte capacitor having an anode of film-forming metal as claimed in claim 1, wherein said solution of manganous nitrate and ammonia releasing material reacts to produce a precipitate consisting essentially of manganous hydroxide which is converted to said manganese dioxide upon the application of said elevated temperature.

4. In an electrolyte capacitor having an anode of film-forming metal as claimed in claim 2, wherein said precipitate is converted to manganese dioxide nucleation sites on said film upon the application of a temperature of about 100°–150° C.

5. In an electrolyte capacitor as claimed in claim 1, wherein said further manganese dioxide layers are formed from a solution of manganous nitrate pyrolytically converted to manganese dioxide upon the application of a temperature of 200° C., or higher.

6. In an electrolyte capacitor having an anode of film-forming metal as claimed in claim 1, wherein said ammonia releasing material is selected from the group consisting of organic and inorganic water soluble ammonia releasing agents.

7. In an electrolyte capacitor having an anode of film-forming metal as claimed in claim 6, wherein said organic and inorganic water soluble ammonia releasing agents are selected from the group consisting of ammonium nitrate, ammonium halides, ammonium sulfate, ammonium borates, ammonium phosphates, urea, ammonium tetraborate, ammonium carbonate, ethyl carbamate, methyl carbamate, acetamide, isobutyramide, 2,4-dimethylacetanilide, m-tolylurea and benzamide.

8. In an electrolyte capacitor having an anode of film-forming metal as claimed in claim 7, wherein said organic and inorganic water soluble ammonia releasing agents are selected from the group consisting of ammonium chloride, ammonium bromide, ammonium nitrate and urea.

9. In an electrolyte capacitor having an anode of film-forming metal as claimed in claim 8, wherein said organic and inorganic water soluble ammonia releasing agents are selected from the group consisting of ammonium nitrate and urea.

10. In an electrolyte capacitor having an anode of film-forming metal as claimed in claim 9, wherein said film-forming metal is selected from the group consisting of tantalum, aluminum, niobium, titanium, zirconium and hafnium.

11. In an electrolyte capacitor having an anode of film-forming metal as claimed in claim 10, wherein said film-forming metal is tantalum.

12. In an electrolyte capacitor having an anode of film-forming metal as claimed in claim 1, wherein said pyrolytic conversion is initiated at the interface between said solution of manganous nitrate and ammonia releasing materials and said dielectric oxide formed on the surface of said anode.

13. In a method for making a solid electrolyte capacitor including the steps of forming a dielectric oxide film on the surface of a film-forming metal anode, covering the surface of said dielectric oxide film with a solution of manganous nitrate, heating said anode to a temperature for pyrolytically converting in situ the material of said solution to a layer of manganese semiconductive oxide material overlying said dielectric film and applying a counterelectrode of electrically conductive material on the surface of the semiconductive oxide layer, the improvement comprising: in the step of covering said dielectric oxide film, the solution consists essentially of an acidic manganous nitrate solution containing a soluble ammonia releasing material productive of at least one compound pyrolytically in situ convertible to manganese semiconductive oxide in a range of temperature with a maximum below the pyrolytic conversion temperature of manganous nitrate to manganese dioxide.

14. In a method of making a solid electrolyte capacitor as claimed in claim 13, further comprising in the heating step a first lower temperature heating to a temperature of about 100–150° C. for first producing a thin manganese dioxide deposit intimately on said dielectric film.

15. In a method for making a solid electrolyte capacitor as claimed in claim 13, wherein said ammonia releasing materials are selected from the group consisting of organic and inorganic water soluble ammonia releasing agents.

16. In a method for making a solid electrolyte capacitor as claimed in claim 15, wherein said releasing material is selected from the group consisting of ammonium nitrate and urea.

17. In a method for making a solid electrolyte capacitor as claimed in claim 16, wherein said solution consists of a concentration of about 0.1 to 10 percent by weight ammonium nitrate, the remainder manganous nitrate.

No references cited.

JAMES D. KALLAM, Primary Examiner

U.S. Cl. X.R.
29—570; 252—188.3